United States Patent [19]

Sirinyan et al.

[11] Patent Number: 4,508,780
[45] Date of Patent: Apr. 2, 1985

[54] METALLIZED POLYMER GRANULES, AND THEIR USE

[75] Inventors: Kirkor Sirinyan; Rudolf Merten, both of Leverkusen, Fed. Rep. of Germany

[73] Assignee: Bayer Aktiengesellschaft, Leverkusen, Fed. Rep. of Germany

[21] Appl. No.: 481,614

[22] Filed: Apr. 4, 1983

[30] Foreign Application Priority Data

Apr. 24, 1982 [DE] Fed. Rep. of Germany ....... 3215413

[51] Int. Cl.³ .......................... B32B 5/16; B32B 15/08
[52] U.S. Cl. ..................................... 428/407; 427/92; 427/212; 428/936

[58] Field of Search ...................... 428/407, 403, 936; 427/92, 212

[56] References Cited

U.S. PATENT DOCUMENTS 4,039,297 8/1977 Takenaka .................... 428/407 X

Primary Examiner—Thomas J. Herber
Attorney, Agent, or Firm—Sprung Horn Kramer & Woods

[57] ABSTRACT

Polymer granules having a single particle volume of 0.01 mm³ to 150 mm³ and a metal layer of 0.5 to 35% by weight, relative to polymer, can be processed by the customary methods of the plastics industry into shaped articles which have permanent antistatic properties and screen off electromagnetic waves.

16 Claims, No Drawings

METALLIZED POLYMER GRANULES, AND THEIR USE

The invention relates to polymer granules which have a metal layer, to their preparation by currentless chemical metallization or by combined currentless chemical and galvanic metallization, and to their use as materials which have antistatic properties and screen off electromagnetic waves.

Organic synthetic and natural polymers are in general electrical insulators. Their specific resistance is between $10^{10}$ and $10^{18} \Omega$ .cm.

If certain polymers having a main chain with a poly-conjugated structure are treated with strong oxidising or reducing agents, their specific resistance drops from about $10^9$ to about $10^1 \Omega$ cm (Organic Semiconductors, F. Gutman, and L. E. Lyons, John Wiley and Sons, Inc.; New York (1967)).

However, such conjugated polymers cannot be processed by such customary methods in plastics technology as injection-moulding, extruding or laminating, and are insoluble in conventional organic and inorganic solvents.

Another way of providing polymers with antistatic properties is to add charge transfer complexes, which are based, for example, on tetrathiofulvalene or tetracyanoquinodimethane. The incorporation of these complexes into polymer matrices is very involved, and therefore of no interest to the plastics-processing industry save in very special cases.

It is also known to apply antistatic agents to the surface of a prepared plastic component or to incorporate antistatic agents during the preparation directly into the polymer matrices, examples of antistatic agents being fatty alcohols and quaternary ammonium salts.

In the first case only a temporary antistatic effect is obtained, while in the second case the incorporation of antistatic agents has an adverse effect on the original physical and chemical properties of the polymer material.

It is also known that polymer surfaces can be provided by chemical or physical means with an electrically conductive metal surface ("Kunststoff-Galvanisierungshandbuch für Theorie und Praxis [Plastics Electroplating Handbook for Theory and Practice]", Eugen-G.-Lenze-Verlag, Saulgau 1973). However, these metal layers have an undesirably high specific electrical conductivity. Another disadvantage is that this process is only possible in the case of certain polymers.

Another way of imparting antistatic properties to polymers is to incorporate metal filaments, metal fibres, metal powders or metallized glass or ceramic fibres.

This method has the disadvantage that an antistatic effect is only obtained when a substantial amount of metal is incorporated into the polymer, the result of which is that, again, the physical properties, such as tensile strength, abrasion and tear resistance, the elastic modulus and extensibility, are reduced.

It is also unfavourable that the distribution of metal obtained in the shaped polymer article is not homogeneous.

It was therefore the object of the invention to provide polymeric materials which can be converted in a simple manner into shaped polymer articles which have antistatic properties.

This object is achieved by providing synthetic or natural polymer granules with a metal layer using currentless chemical metallization or combined currentless chemical and galvanic metallization, and then processing the granules thus treated by methods customary in the plastics industry.

The invention therefore relates to polymer granules having a single particle volume of 0.01 to 150 mm$^3$ and a metal layer of 0.5 to 35% by weight, relative to polymer.

Preferably the single particle volume is 0.1 to 50 mm$^3$ and the metal layer is 3 to 25% by weight.

The granules can have any desired shape, that is be cubes, cylinders, spheres, rods, semispheres or pyramids.

The polymers can be homopolymers, copolymers or graft copolymers. Synthetic polymers are preferable. Examples of suitable polymers are polypropylene, polyvinyl chloride, polyvinyl acetate, polyethylene, polystyrene, ABS graft or copolymers, polybutadiene, polyisoprene, polyethylene oxide, polyesters, polyamides, polyhydantoin, polyureas, polyimides, polycarbonates, epoxy resins and their mixtures and alloys.

The polymers can contain fillers and additives, customary in plastics processing, such as stiffening, reinforcing, shaping or stabilising agents.

Preferable metals are nickel, copper, silver, cobalt, tin, zinc, lead, cadmium, chromium or gold, in particular copper or nickel.

The invention also relates to a process for preparing granules having a metal layer, which is characterised in that, without prior adhesion-improving treatment, metals of the groups 1B or VIII of the periodic table of the elements (PTE) are applied to the surface of the granules, and the granules are then subjected to currentless wet chemical and, if appropriate, also galvanic metallization.

The surface of the granules can be activated with ionic or metallo-organic compounds of elements of groups 1B or VIII of the PTE or with colloidal metals of these groups, the ionic and metallo-organic compounds having to be reduced after application.

The preferable activating metal is palladium, in particular in the form of a metallo-organic compound.

Those groups of the organic part of the abovementioned metallo-organic compounds which are required to bond the metal are in themselves known. The bonds are, for example, C-C or C-N double and triple bonds and the groups which can form a chelate complex are, for example, OH, SH, CO, SC or COOH groups. The use of those metallo-organic compounds of elements of groups 1B and VIII of the PTE which, in addition to the groups required to bond the metal, also have at least one further functional group has the advantage that an improved degree of fixation of activation nuclei to the surface of the substrate is obtained.

Groups which are particularly suitable for fixing the activator to the surface of the substrate are functional groups, such as carboxylic acid groups, carbonyl halide groups, carboxylic anhydride groups, carboxylate groups, carboxamide and carboximide groups, aldehyde and ketone groups, ether groups, sulphonyl halide groups, sulphonate groups, halogen-containing heterocyclic radicals, such as chlorotriazinyl, chloropyrazinyl, chloropyrimidinyl or chloroquinoxalinyl groups, activated double bonds, as in vinylsulphonic acid or acrylic acid derivatives, amino groups, hydroxyl groups, isocyanate groups, olefine groups and acetylene groups as well as mercapto groups and epoxide groups, also relatively long-chain alkyl or alkenyl radicals from $C_8$ upwards, in particular oleic, linoleic, stearic or palmitic groups.

The use of oligomeric, polymeric or prepolymeric metallo-organic compounds of elements of groups IB and VIII of the PTE has the additional advantage that a smaller amount of noble metal is required per unit area for adequate activation.

The organometallic activators are used in the form of a solution, dispersion, emulsion or suspension in an organic solvent or in the form of a mixture with an organic solvent. Solvent mixtures can also be used.

Those organic solvents are preferably used which incipiently swell the surface of the polymer. Swelling agents for specific polymers are described in Polymer Handbook. J. Brandrup, E. H. Immergut, John Wiley and Sons, Inc., New York (1974).

Suitable solvents are lower and higher alcohols, aldehydes, ketones, halogenated hydrocarbons, simple or saturated hydrocarbons, organic acids and esters, and liquefied gases, such as butane, propylene and 1,4-cis-butadiene.

Solvent mixtures can contain as further solvents naphtha, ligroin, toluene, n-hexane or the like. The activating baths can contain anionic emulsifiers, such as alkali metal salts of palmitic acid, stearic acid, oleic acid, salts of sulphonic acids which are prepared by sulpho-chlorinating paraffins containing 6–20 carbon atoms, nonionic emulsifiers, which can be prepared, for example, by ethoxylating long-chain alcohols or phenols, cationic emulsifiers, such as salts of long-chain amines having 12 to 20 C atoms or quaternary ammonium compounds having long-chain olefines or paraffin esters, protective colloids based on macromolecular compounds, such as gelatin, pectins, alginates, methylcellulose, ionic and neutral polyurethane dispersions or their oligomeric derivatives, polyvinyl alcohols, polyvinylpyrrolidone, poly(methyl vinyl acetate), finely divided water-soluble minerals, such as alumina, kieselguhr, calcium phosphates, alkali and alkaline earth metal salts, such as NaCl, $CaCl_2$, $MgSO_4$ or $K_3PO_4$.

The quantity of the additives listed above can be varied, relative to the given medium, between 0.01 and 20% by weight.

The granules are wetted with the activating baths, the treatment period preferably being between 1 second and 90 minutes.

After the wetting, the organic solvent is removed and the metallo-organic compound is reduced.

It may be necessary to clean the granules by rinsing away reducing agent residues. The granules thus activated are subjected to currentless metallization.

In a preferable embodiment of the process according to the invention, the reduction in the metallization bath is carried out immediately with the reducing agent of the currentless metallization. This embodiment is suitable for aminoborane-containing nickel baths or formalin-containing copper baths. Metallization baths suitable for use in the process according to the invention are preferably baths containing nickel salts, cobalt salts, copper salts, gold or silver salts or their mixtures with one another. Such chemical metallizing baths are known in the technology of currentless metallization.

The granules which have been provided with an electrically conductive metal layer are, if appropriate, galvanically enhanced. Galvanizing baths which are suitable for use in the process according to the invention are preferably baths containing Ni, Cu, Co, Au, Ag, Sn, Zn, Pb, Cr or Cd salts or their mixtures with one another. Such galvanizing baths are known in electroplating technology.

The granules which have been provided with a metal layer are processed by means of processes customary in the plastics industry, such as extruding, calendering, blow-moulding, compression-moulding or injection-moulding, the latter two methods being preferable. The distribution of the metal in the shaped articles obtained is largely homogeneous.

The shaped polymer articles have excellent, permanent antistatic properties. They also screen off electromagnetic waves, so that it is possible to make out of them, for example, casings for electronic calculators, which are protected against the damaging effect of such waves.

Another important use of metallized polymer granules is in the decorative field, where granules metallized according to the invention with a metal layer of 0.5–10% by weight are preferably used, amounts of 0.5–5.0% by weight being particularly preferable.

Polymeric materials based on the abovementioned granules have a high metallic effect and a completely smooth and shiny surface. Unlike present polymeric materials bearing metallic paints they are scratchproof and impact-resistant, since not only the surface but also the matrix contains metal agglomerates (pigments).

It is of course possible to obtain the same metallic effect by incorporating such granules in thermosetting plastics, such as epoxy resins and phenolic resins, or by admixing to or mixing with non-metallized polymer granules.

EXAMPLE 1

50 g of acrylonitrile/butadiene/styrene graft copolymer (ABS) granules having a single particle volume of about 15 $mm^3$ are dipped at room temperature for 30 seconds into an activating bath of 0.5 g of isobutylvinyl ether palladium dichloride in 1 liter of 1,1,1-trichloroethane, dried at room temperature, and dipped for 45 minutes into 10 liters of an aqueous nickel-plating bath which contains per liter 3.5 g of dimethylaminoborane, 30 g of nickel chloride and 10 g of citric acid and has been set at pH 8.2 by means of concentrated ammonia solution.

The metallically shiny granules are removed from the bath, washed with distilled water, and dried at 70° C. in a drying cabinet.

The nickel-plated granules have a metal layer of 5% by weight. A compression-moulded board prepared therefrom (100×100 mm) with a mean thickness of 2.1 mm has a specific volume resistance of about 100Ω and an electrical surface resistance of about 10 Ω.

EXAMPLE 2

10 kg of the ABS granules obtained according to Example 1 are activated in an activating bath of 4-cyclohexene-1,2-dicarboxylic anhydride palladium dichloride and 5 liters of methanol, and provided in a nickel-plating bath according to Example 1 in the course of 8 minutes with a nickel layer of about 0.8% by weight, relative to the polymer weight.

An ABS injection-moulded board prepared therefrom with a mean thickness of 1.5 mm has a metallically shiny and smooth surface.

EXAMPLE 3

1 kg of polyamide-6,6 granules having a single particle volume of 20 mm$^3$ is dipped at room temperature into an activating solution of 1.8 g of 9-octadecen-1-ol palladium dichloride in 1 liter of methanol, dried, and then nickel-plated in a chemical nickel bath according to Example 1.

Granules are obtained which have a metal layer of 4.5% by weight and which are injection-moulded into shaped plastic articles.

EXAMPLE 4

50 g of polycarbonate granules are activated according to Example 1, and then nickel-plated in a chemical nickel bath according to Example 1 in the course of 8.5 minutes.

Nickel-plated granules are obtained which bear a metal layer of 1.0% by weight and which connected as the cathode in an aqueous electrocoppering bath which contains per liter 200 g of $CuSO_4 \times 5H_2O$ and 30 g of $H_2SO_4$ (g=1.84 g/cm$^3$) are reinforced at 3.0 ampere with 15% by weight of copper, relative to polymer.

EXAMPLE 5

50 g of the granules described in Example 1 are activated according to Example 3, dried and copper-plated at 35° C. without current in an aqueous coppering bath which contains per liter 10 g of $CuSO_4$, 5 ml of a 37% strength aqueous formalin solution and 15 g of potassium sodium tartrate tetrahydrate and is set at pH 12 to 13 by means of 20 ml of a 30% by weight strength NaOH solution. The granules have a metal layer of 4% by weight.

An ABS compression-moulded board (100×100 mm) prepared therefrom with a mean thickness of 2 mm has a specific volume resistance of about 150Ω and an electrical surface resistance of about $10^8$Ω.

EXAMPLE 6

100 g of polystyrene granules having a single particle volume of about 4 mm$^3$ are activated according to Example 1 and then nickel-plated in the course of 10 minutes in a chemical nickel bath according to Example 1. The nickel layer is 0.9% by weight. The granules are galvanically reinforced with 15% by weight of copper according to Example 4.

EXAMPLE 7

50 g of cellulose acetate granules are provided in the course of 2 hours with a nickel layer of 11% by weight according to Example 1, and then injection-moulded into shaped articles.

EXAMPLE 8

100 g of polyethylene granules are activated at room temperature in the course of 15 seconds with 0.6 g of butadiene palladium dichloride in 1 liter of $CH_2Cl_2$, dried, and nickel-plated according to Example 1.

After 30 minutes the granules are removed from the bath, washed with distilled water, and dried at 100° C. in the course of 4 hours in a drying cabinet. Polymer granules are obtained which have a metal layer of 3.0% by weight.

EXAMPLE 9

5.0 kg of ABS granules are provided according to Example 1 with an 0.8% by weight strength Ni layer, and then processed like a thermoplastic.

A polymer material is obtained which has a completely smooth shiny surface and a high metallic effect and the physical properties of which, such as notched impact strength, Mertens temperature, softening range, and stress/strain behaviour, are not affected by the metal particles.

EXAMPLE 10

3.0 kg of commercially available polyamide 6 granules are provided according to Example 3 with an 0.6% by weight strength Ni layer, and then processed like a thermoplastic. A specimen is obtained which has a high quality surface and a metal effect and the physical properties of which are not affected by the metal particles.

EXAMPLE 11

2.5 kg of ABS granules are activated with a colloidal Pd solution from Messrs. Schering AG, Berlin, sensitised with a hydrochloric acid $Sn^{2+}$ solution, provided with a 0.7% by weight strength Cu Layer in a chemical Cu bath, and then processed like a thermoplastic.

A specimen is obtained which has a copper/gold metallic effect.

EXAMPLE 12

5.0 kg of commercially available polypropylene granules are provided according to Example 8 with a 0.5% by weight strength Ni layer, and then processed like a thermoplastic. A specimen is obtained which has a smooth surface and a metallic effect and the properties of which, such as tensile strength, or softening range, are not affected by the metal particles.

We claim:

1. Polymer granules having a single particle volume of 0.01 mm$^3$ to 150 mm$^3$ and a metal layer of 0.5 to 35 percent by weight, relative to polymer said metal layer obtained by currentless chemical metallization after activating the surfaces of the granules with metallo-organic compounds of elements of group 1B or VIII of the periodic table of the elements and subsequently reducing said metallo-organic.

2. Polymer granules according to claim 1, having a single particle volume of 0.1 to 50 mm$^3$ and a metal layer of 3 to 25% by weight.

3. Polymer granules according to claim 1, having a layer of nickel, copper, silver, cobalt, gold, tin, zinc, lead, chromium or cadmium.

4. Polymer granules according to claim 1, having a layer of nickel, cobalt or copper.

5. A polymer granule according to claim 1, wherein the polymer is acrylonitrile/butadiene/styrene graft copolymer.

6. A polymer granule according to claim 1, wherein the polymer is polyamide-6,6.

7. A polymer granule according to claim 1, wherein the polymer is a polycarbonate.

8. A polymer granule according to claim 1, wherein the polymer is polystryene.

9. A polymer granule according to claim 1, wherein the polymer is cellulose acetate.

10. A polymer granule according to claim 1, wherein the polymer is polyethylene.

11. A polymer granule according to claim 1, wherein the polymer is polyamide 6.

12. A polymer granule according to claim 1, wherein the polymer is polypropylene.

13. Use of the granules provided with a metal layer, according to claim 1, for preparing shaped articles.

14. A shaped article of polymer granules according to claim 1.

15. A shaped article according to claim 14, in the form of a board.

16. A shaped article according to claim 15, wherein the polymer is an acrylonitrile/butadiene/styrene graft polymer.

* * * * *